United States Patent [19]

Hustedt

[11] 4,286,936

[45] Sep. 1, 1981

[54] INJECTION CASTING APPARATUS FOR SHOE SOLES

[75] Inventor: Hans Hustedt, Verden, Fed. Rep. of Germany

[73] Assignee: Desma-Werke GmbH, Achim bei Bremen, Fed. Rep. of Germany

[21] Appl. No.: 125,055

[22] Filed: Feb. 27, 1980

[30] Foreign Application Priority Data

Feb. 28, 1979 [DE] Fed. Rep. of Germany ....... 2907751

[51] Int. Cl.³ .......................... B29D 9/00; B29C 1/16; B29H 7/08
[52] U.S. Cl. .................................... 425/119; 264/244; 425/125; 425/126 R; 425/129 S; 425/183; 425/576
[58] Field of Search ..................... 425/119, 129 S, 125, 425/126 R, 183, 576; 264/244

[56] References Cited

U.S. PATENT DOCUMENTS

| | | | |
|---|---|---|---|
| 3,555,609 | 1/1971 | Chu et al. | 425/119 |
| 3,608,151 | 9/1971 | Cloutier et al. | 425/119 |
| 3,667,883 | 6/1972 | Ludwig et al. | 425/119 |
| 3,709,973 | 1/1973 | Maltby | 264/247 |
| 4,123,493 | 10/1978 | Schilke et al. | 425/119 |
| 4,165,958 | 8/1979 | Malburg | 425/119 |

FOREIGN PATENT DOCUMENTS 971810 8/1964 United Kingdom ....................264/244

*Primary Examiner*—James B. Lowe
*Attorney, Agent, or Firm*—Sughrue, Mion, Zinn, Macpeak and Seas

[57] ABSTRACT

An injection casting apparatus for the manufacture of multiple layer shoe soles in a multiple element mold (11). The bottom of each mold is closed by one of two bottom stamps (14, 15) disposed on the ends of support arms (23, 24) which are mounted about an inclined axis of rotation (42). The bottom stamp not in use is directed radially outward from the apparatus to improve servicing and cleaning. The bottom stamp in use is centered above a raising and lowering device (37) which moves the stamp into operating position to close the mold and away therefrom to rotate the stamps. This centered arrangement prevents any torque from arising in the bottom stamp during use.

5 Claims, 3 Drawing Figures

INJECTION CASTING APPARATUS FOR SHOE SOLES

BACKGROUND OF THE INVENTION

The invention relates to an injection casting apparatus for the manufacture of multiple part shoe soles, preferably double layer shoe soles of polyurethane, in a mold consisting of a side mold, an upper mold (last with shoe shaft) and bottom stamps to form at least a first and second hollow mold chamber, the mold being closed by one of two alternating bottom stamps.

To manufacture shoe soles by injection casting and simultaneously mold to a shoe shaft, either the intermediate sole facing the shoe shaft can be produced first and then be connected with the shoe shaft, whereafter the lower sole is manufactured and connected with the intermediate sole, or the sole layers can be formed in the reverse order. The latter method is commonly practiced in working with polyurethane.

The use of a plurality, particularly two bottom stamps for alternating closure of the hollow mold chambers on the side facing the sole is necessary for a number of reasons, particularly for the manufacture of soles with differently formulated layers. German OS No. 1,704,234 describes an injection casting apparatus in which an indexable turntable is provided with a plurality of multiple-element injection casting molds. In this apparatus two bottom stamps are alternately brought down into use from a position above the mold. The bottom stamps, in turn, are arranged on support arms disposed at a right angle to each other and which meet at a common rotating bearing lying outside the region of the mold. A drive mechanism is arranged alongside the mold, which can be raised and lowered and is also capable of rotating the support arms in such a manner that one or the other of the bottom stamps closes the mold or both bottom stamps are out of engagement therewith.

The bottom stamps in this known device are attached to the support arms in the lonitudinal direction thereof. In the closed position of the mold, however, this results in a static, unfavorable force transfer. The stroke and rotation apparatus is displaced relative to the bottom stamp currently in the operating position. This has the result that the closing forces transferred to the bottom stamps produce a significant additional torque. Furthermore, this apparatus is awkward to handle, because the rotation and stroke apparatus is disposed in the interior region of the rotatable table and the bottom stamp not in use is directed towards the center of the rotatable table.

SUMMARY OF THE INVENTION

The basic objective of the invention is provide an injection casting apparatus for shoe soles, shoe elements and this type of preforms, which is equipped with two alternating bottom stamps or the like for forming successive sole layers, and which also provides an optimal force flow as well as simplified servicing, particularly in an embodiment with a rotatable table and a plurality of stations.

To achieve this objective the apparatus according to the invention is characterized by the fact that the bottom stamps which move up to close the mold from a position beneath same are disposed on a known, common rotatable head having support arms which form an angle, particularly a right angle, each of which carries a bottom stamp in such a way that the bottom stamp in use with the mold is disposed laterally on the upper end of an upright support arm and the other bottom stamp is disposed upright and laterally to the end of a horizontally directed support arm.

Accordingly, the invention uses the known principle of arranging the two bottom stamps on support arms forming a right angle to each other. The support arms, however, are part of a rotatable head which is arranged on an inclined axis of rotation, so that the bottom stamp subjected to load sits on the upper end of an upright support arm. In this manner the closing force exerted on the bottom stamp can flow exclusively along the longitudinal direction of the support arm without torque. The other support arm carrying the bottom stamp not in use is arranged horizontally. When using this apparatus on a rotatable table having a plurality of coordinated stations, according to a further proposal of this invention, this horizontally disposed support arm is arranged to point radially outwards in such a manner that the bottom stamp located thereon is held in an upright position at the free circumference of the rotatable table and is therefore easily accessible for cleaning and other necessary operations.

DETAILED DESCRIPTION OF THE PREFERRED EMBODIMENTS

Figure 1:
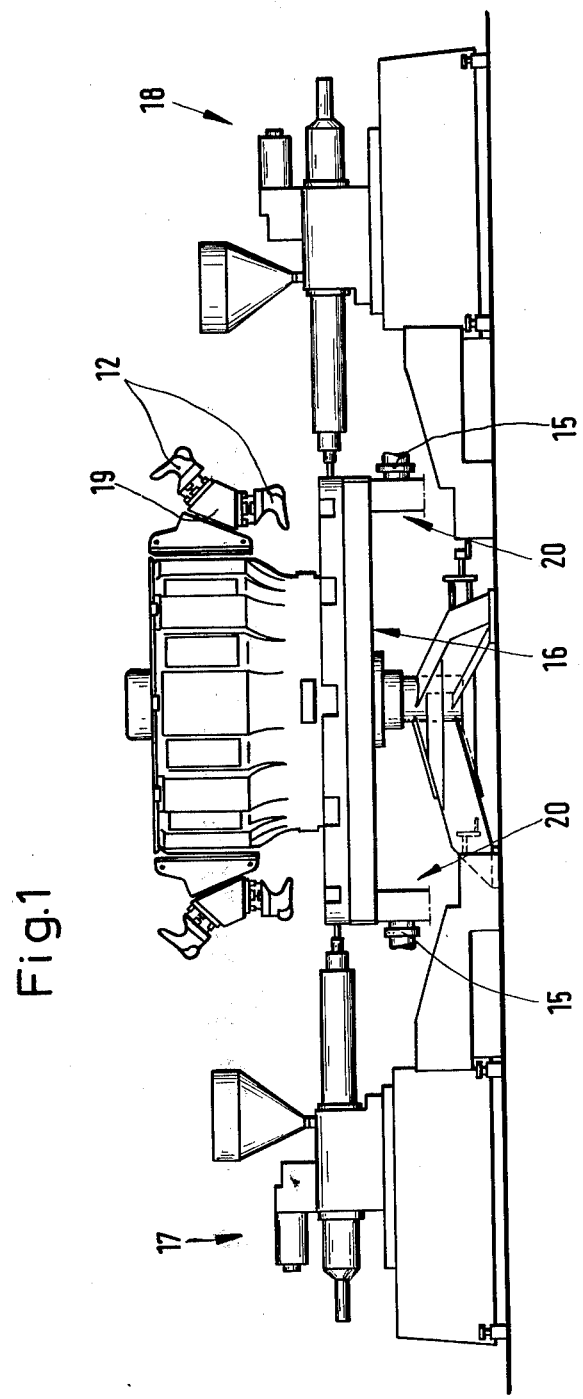
FIG. 1 is a schematic side view of a round table system having a plurality of injection stations.

The embodiments shown relate to the manufacture of double-layer shoe soles 10, made for example of polyurethane, by injection casting. A mold 11 used for this purpose consists of a last 12 for receiving a shoe shaft (not shown), a longitudinally divided side mold 13 and two bottom stamps 14 and 15 which are used alternatively with this mold 11. The above mold elements form the limits of a hollow mold chamber for forming the respective sole layers.

To provide soles of various lengths and widths, a plurality of molds 11 of the above type can be arranged on a rotatable table 16 of an injection casting system according to FIG. 1 which is equipped with a plurality of stations. The raw materials to form the layers of the shoe soles 10 are fed into the associated hollow mold chambers by two injection casting apparatuses 17 and 18 which can be brought into association with the molds 11 in various stations. The lasts 12 belonging to the molds 11 are arranged in pairs on a rotatable element 19 above the table 16, i.e. above the other elements of the mold 11. The rotatable element 19 equipped with two lasts 12 can be raised and lowered in order to move the respective lower lasts 12 to the side mold 13 or to lift them away therefrom.

A bottom stamp apparatus 20 is arranged beneath a table plate 21 of the table 16 in the vicinity of each station.

The bottom stamp apparatus 20 is equipped with a rotatable head 22 which carries the two bottom stamps 14 and 15 at a right angle to each other. The rotatable head 22 therefore has laterally projecting and bent support arms 23 and 24 on opposite sides thereof. Bottom stamps 14, 15 are mounted at the respective ends thereof such that their molding upper sides 25 are directed laterally to the longitudinal axis 26 of their respective support arms 23, 24.

The bottom stamps 14, 15 are mounted on a support plate 27, which is connected with the frontal end of the support arm 23, 24 by an intermediate plate 28.

The rotatable head 22 with its support arms 23, 24 is arranged in a special relative position beneath the table plate 21. The bottom stamp found in the operating position, namely within the mold 11,—bottom stamp 14 in FIGS. 2 and 3—is disposed in a basically horizontal fashion on the upwardly directed support arm 23. The table plate 21 is provided with openings 29 for the passage of the bottom stamps 14, 15 together with support plates 27 and intermediate plates 28. The longitudinal axis of the other bottom stamp 15 extends in a vertical direction. The support arm 24 for this bottom stamp 15 is thus horizontal. The bottom stamp 15 extends radially outward somewhat beyond the outer edge of the table plate 21. Ths simplifies access to the upper side 25 of the bottom stamp.

To change the positions of the bottom stamps 14 and 15, first the entire bottom stamp apparatus 20 is lowered until the bottom stamp 14 located in operating position lies below the table plate 21. The rotatable head 22 is then rotated by 180°.

The rotatable head 22, which includes a basin-like recess 30, is rotatably mounted on an inclined hub 31. A spindle element 32 is mounted and guided in the center of this hub 31. The spindle element 32 is rigidly connected with the rotatable head 22 and is acted upon to cause rotation thereof by a rotary drive means 33, which may consist of a pressurized cylinder and a steering rack. The latter acts on a toothed quadrant of the spindle element 32.

The hub 31 with the rotary drive 33 located thereon is mounted by means of a bracket 34 on a basically horizontal stroke plate 35. The latter accordingly supports the heightadjustable portion of the bottom stamp apparatus 20.

Figure 2:
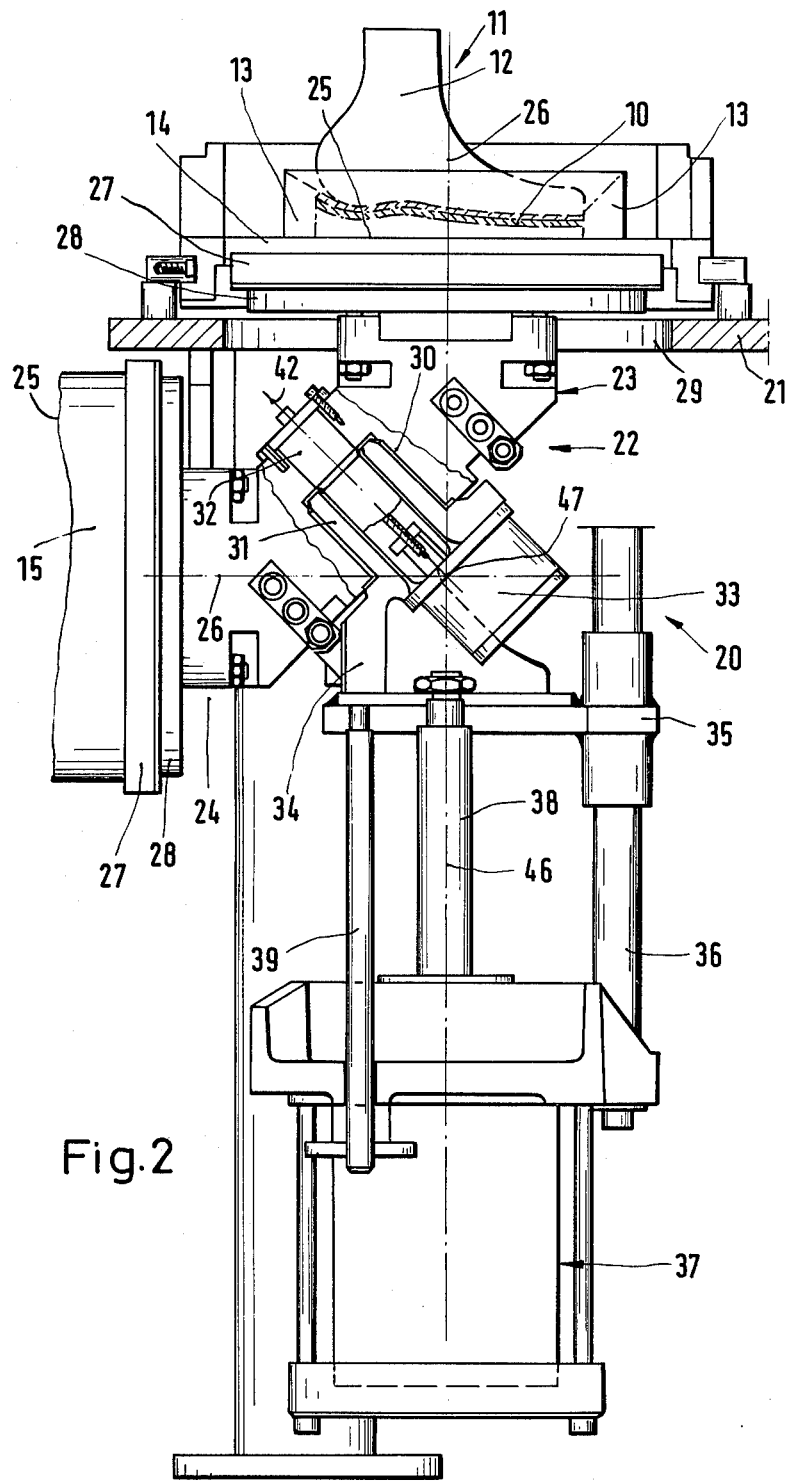
FIG. 2 is a schematic side view of an individual injection casting apparatus partially in section, and enlarged relative to FIG. 1.

The stroke plate 35 is slidably mounted on two upright guide rods 36—only one such guide rod 36 is recognizable in FIG. 2, the other lies in the same plane therebehind—connected to the rotatable table 16. The bottom stamp apparatus 20 hangs on these guide rods 36. The height of the stroke plate 35 can thus be adjusted by sliding on the rods.

A pressurized cylinder 37 is mounted at the lower end of the guide rods 36 to provide the stroke movements. A piston rod 38 thereof is connected with the stroke plate 35. A limit rod 39 provided with a variable stop can adjust the stroke height for the plate 35 and thereby for the moveable portion of the bottom stamp apparatus 20.

Figure 3:
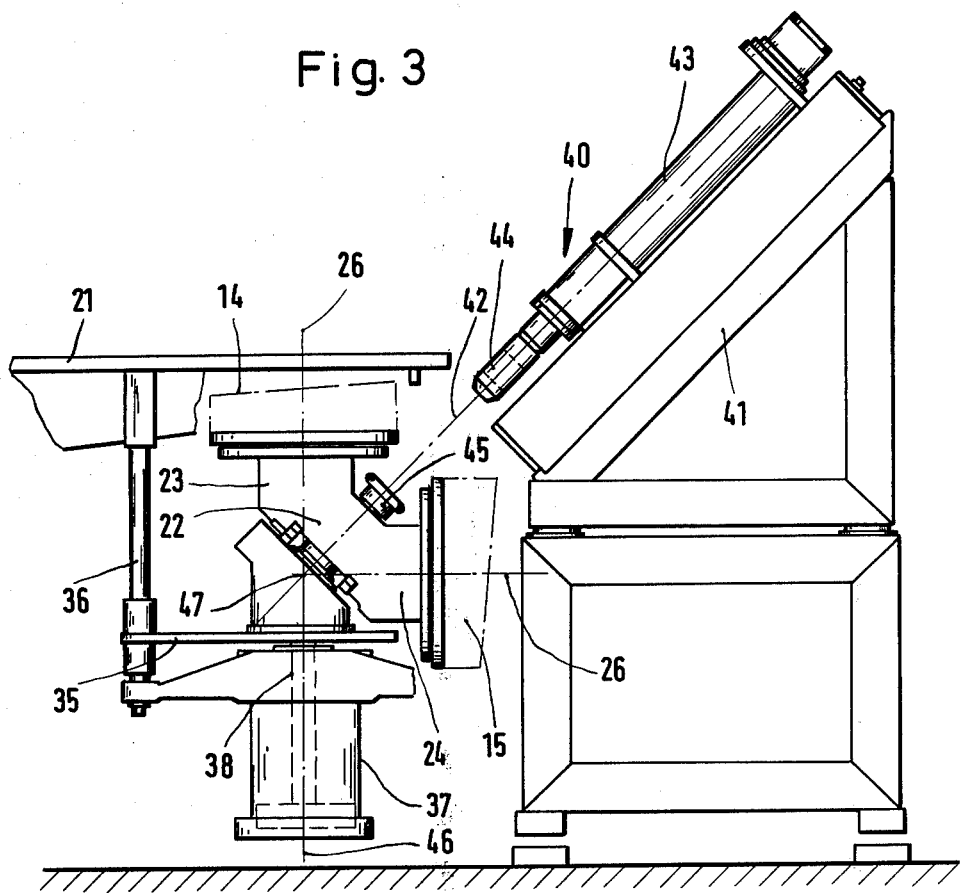
FIG. 3 is a partial sectional side view of an alternative embodiment of an injection apparatus according to the invention.

In the modified embodiment according to FIG. 3 the moveable portion of a bottom stamp apparatus, namely the rotatable head 22 with the bottom stamps 14, 15, is shown in the bottom, lowered position. The rotary movements of the head 22 are performed in this position. For this purpose an external, stationarily mounted drive apparatus 40 is provided in the example according to FIG. 3. This drive apparatus 40 is located outside the area of the rotatable table 16 and is rigidly mounted in the region of the stations where the rotary movements of the head 22 are performed.

A rotary drive 43 of suitable construction is mounted on an angled frame 41 so as to be moveable along an inclined axis which corresponds with the axis of rotation 42 of the rotatable head 22. This rotary drive 43 is provided with a fork 44 which rotates about axis 42 and serves as a coupling member to the rotatable head 22, which in turn includes a corresponding counter member 45. Shifting the rotary drive 43 along the axis 42 brings it into drive connection with the rotatable head 22. By activating the rotary drive 43 the rotary movement is then carried out.

The rotary drive 43 can be formed, for example, with a drive cylinder, and rack and toothed quadrant in the sense of the rotary drive 33.

One peculiarity of both embodiments of the bottom stamp apparatus 20 is the favorable force flow. The stroke apparatus for the rotatable head 22, i.e. the pressurized cylinder 37, also exerts a mold closing force on the upper bottom stamp 14 located in the operating position. The center of the bottom stamp, the (center) longitudinal axis of the support arm 23 and a central axis 46 of the pressurized cylinder 37, i.e. the piston rod 38, run along a common plane, so that the forces are transferred without giving rise to torques. The longitudinal axis 26 of the other support arm 24, which is perpendicular to the first support arm 23, and the axis of rotation 42 of the rotatable head 22 meet at a common point 47.

What is claimed is:

1. An injection molding apparatus for the manufacture of multi-layer shoe soles, particularly double layer polyurethane shoe soles, comprising:
   (a) a first horizontally disposed, rotationally indexable turret,
   (b) a second horizontally disposed, rotationally indexable turret positioned above the first turret,
   (c) a plurality of selectable shoe lasts mounted on the outer periphery of the second turret in a circumferentially spaced manner,
   (d) a plurality of mold assemblies mounted on the outer periphery of the first turret in a circumferentially spaced manner and individually cooperable with the shoe lasts,
   (e) at least one sole material injection device fixedly mounted proximate the outer periphery of the first turret and selectively cooperable with an adjacent mold assembly,
   (f) each mold assembly including a separable side mold adapted to be closed at its top by a shoe last,
   (g) a plurality of rotatable heads individually mounted beneath the mold assemblies and having respective axes of rotation upwardly and outwardly inclined relative to the axis of the first turret,
   (h) a pair of support arms extending outwardly from each rotatable head and having intersecting longitudinal axes bisected by the rotatable head axis,
   (i) a pair of alternately selectable sole molds individually mounted on the outer ends of the support arms,
   (j) pressure cylinder means for raising and lowering each rotatable head to close the bottom of a mold assembly with a selected one of said sole molds and to disengage it therefrom, said pressure cylinder means operating along a vertical axis common to the selected sole mold and its associated support arm to prevent the occurrence of torque moments in the closed mold assembly, and
   (k) the support arm of each non-selected sole mold extending radially outwardly from the first turret and each non-selected sole mold havine a generally upright longitudinal axis.

2. Injection molding apparatus according to claim 1, wherein each rotatable head is mounted beneath a table plate of said first turret and said non-selected sole mold projects outwardly beyond the outer periphery of said table plate.

3. Injection molding apparatus according to claim 1, wherein each rotatable head is mechanically rotated by a stationary drive apparatus, a rotary drive unit thereof being engageable with said rotatable head by the extension of said unit along a longitudinal and rotational axis thereof.

4. Injection molding apparatus according to claim 1, wherein each rotatable head is mounted on a horizontal plate which is in turn mounted on vertical guide rods so as to be raisable and lowerable.

5. Injection molding apparatus according to claim 4, wherein each rotatable head is associated with a separate rotary drive unit mounted with said rotatable head on said plate.

* * * * *